United States Patent [19]

Wurr et al.

[11] 4,206,836

[45] Jun. 10, 1980

[54] DRIVE FOR ROTARY KILNS, MILLS AND THE LIKE

[75] Inventors: Jürgen Wurr, Ennigerloh; Reinhard Korting, Enniger, both of Fed. Rep. of Germany

[73] Assignee: Polysius AG, Neubeckum, Fed. Rep. of Germany

[21] Appl. No.: 843,425

[22] Filed: Oct. 19, 1977

[30] Foreign Application Priority Data

Sep. 11, 1976 [DE] Fed. Rep. of Germany ... 7635388[U]

[51] Int. Cl.[2] ....................... B60K 41/28; F16D 67/02

[52] U.S. Cl. ...................................... 192/7; 192/17 R

[58] Field of Search ........................... 34/121; 432/103; 192/4 R, 7, 17 R; 74/411.5; 188/180

[56] References Cited

U.S. PATENT DOCUMENTS

| | | | |
|---|---|---|---|
| 654,620 | 7/1900 | Garver | 192/4 R |
| 2,219,551 | 10/1940 | Osgood | 188/180 |
| 2,416,122 | 2/1947 | Shaffer | 188/180 |
| 2,451,373 | 10/1948 | Beall | 188/180 |
| 2,910,286 | 10/1959 | Holm | 432/119 |
| 3,257,104 | 6/1966 | Marland | 192/4 R |

*Primary Examiner*—George H. Krizmanich
*Attorney, Agent, or Firm*—Marshall & Yeasting

[57] ABSTRACT

The apparatus comprises a main drive including a main motor and main gearing disposed between the main motor and the unit being driven; an auxiliary drive including an auxiliary motor and auxiliary gearing disposed between the auxiliary motor and the main gearing; a clutch between the auxiliary gearing and the main gearing; and a centrifugal brake connected to the auxiliary drive. A further centrifugal brake is connected to the main drive.

3 Claims, 1 Drawing Figure

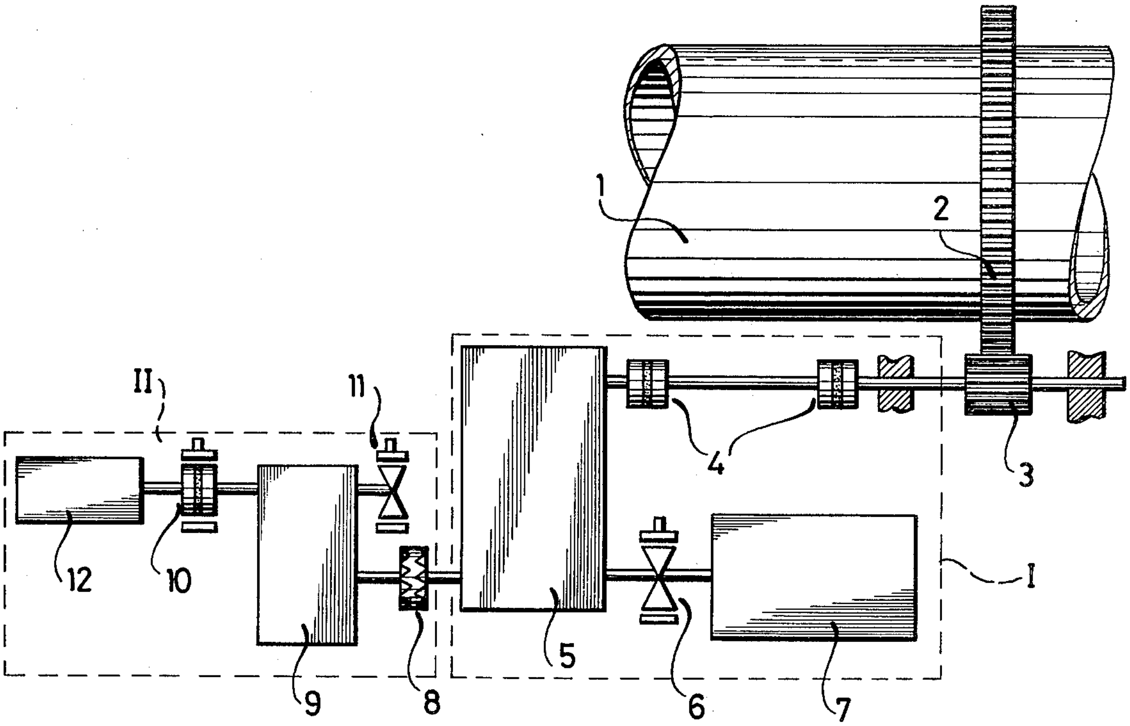
1
2
3
4
5
6
7
8
9
10
11
12
I
II

DRIVE FOR ROTARY KILNS, MILLS AND THE LIKE

BACKGROUND OF THE INVENTION

This invention relates to a drive device for rotary tube furnaces, mills and the like, comprising a main drive including a main motor, main gearing disposed between the main motor and the unit being driven, an auxiliary drive including an auxiliary motor, auxiliary gearing disposed between the auxiliary motor and the main gearing; a clutch between the main and auxiliary gearings and a centrifugal brake in the vicinity of the auxiliary drive.

With known drive devices of the above type, the auxiliary drive is disconnected by means of the clutch during normal operation. If now the main drive is switched off or the main motor fails for any reason, the rotary tube furnace swings back into a position determined by the centre of gravity. The excessive rotary speeds which can occur in such cases may lead to serious damage to the main gearing and main motor.

To avoid these disadvantages a drive device has already been developed (German Gebrauchsmuster 71 30 651) wherein an overriding clutch is provided for overriding the auxiliary drive. If the rotary furnace swings backward, this clutch brings into operation a centrifugal brake disposed in or at the auxiliary gearing, so that the entire drive is protected from excessively fast rotation. This centrifugal brake provided in the auxiliary drive also becomes operative if the auxiliary motor fails (when the rotary furnace is being driven by the auxiliary drive) and the rotary furnace for that reason swings backward.

However, it now has been found that in many cases (especially for rotary furnaces with planetary coolers) in certain circumstances such as during repairs, the rotary furnace can swing forward in the direction of operational rotation when the motor is switched off. In such a case the overriding clutch in the known drive device referred to above would release the rotary furnace to swing in the operational rotation direction, which may involve dangerously excessive speeds.

SUMMARY OF THE INVENTION

The object of the invention is to obviate the defects of the known constructions by providing a drive device in which the rotary tube furnace or other unit being driven is completely prevented from swinging at an impermissible excessive speed, in all operating circumstances and in both directions of rotation.

According to the invention this object is achieved by providing a drive device of the type initially defined with a further centrifugal brake connected to the main drive.

In its engaged condition a clutch provided between the main gearing and the auxiliary gearing in the drive device according to the invention produces a rigid conjunction between the main and auxiliary gearings in both directions of rotation. A first centrifugal brake connected to the auxiliary drive, which is effective in both rotational directions, protects the main gearing and the auxiliary motor from excessive rotary speeds. The further centrifugal brake provided in the main drive area in accordance with the invention, which also may be operative in both directions, prevents excessive rotary speeds when during normal operation the auxiliary drive is completely disconnected from the main drive by the coupling. Since during drive by the main motor, should that motor be switched off or fail only a turning back of the rotary furnace need be expected, this further centrifugal brake if desired may be operative only in this one rotational direction.

The further centrifugal brake provided in accordance with the invention can be disposed between the main motor and the main gearing, or on a second shaft driven by the main motor, or on a drive or intermediate shaft in the main gearing.

The braking speed of the further centrifugal brake preferably corresponds to a motor speed between 5 and 20%, for example about 10%, above the rated speed of the main motor.

BRIEF DESCRIPTION OF THE DRAWING

The drawing is a diagrammatic elevation of a device embodying the invention.

DESCRIPTION OF THE PREFERRED EMBODIMENT

During normal operation the rotary tube furnace 1 is driven, via a toothed wheel 2, a pinion 3, a flexible clutch 4, main gearing 5 and a centrifugal brake 6, from a main motor 7 (an adjustable DC motor).

In addition to this main drive I provided for normal operation, there is provided an auxiliary drive II, comprising a clutch 8 operative in both rotational directions, auxiliary gearing 9, a flexible clutch 10 with a friction brake, a centrifugal brake 11 and an auxiliary motor 12 (AC motor).

When the rotary furnace 1 is being driven by the main motor 7 the clutch 8 is disengaged: there is then no connection between the main drive I and the auxiliary drive II. In this case the rotary furnace 1 is driven from the main motor 7 via the main gearing 5, clutch 4, pinion 3 and toothed wheel 2. The centrifugal brake 6 is not engaged, since its braking speed lies about 10% above the rated speed of the main motor 7.

If now the main motor 7 is switched off or fails due to some defect, the furnace 1 swings back into a position determined by its centre of gravity, due to a one-sided filling with material and any lack of uniformity in the charge. It thus drives the main motor 7 backward through the main gearing 5. When an excess rotary speed of about 10% is reached, the braking effect of the centrifugal brake 6 is initiated and prevents further rise of rotary speed.

When the rotary furnace 1 is being driven by the auxiliary drive II, the clutch 8 is engaged, thus forming a connection between the main gearing 5 and the auxiliary gearing 9. The friction brake for the flexible clutch 10 is released and the auxiliary motor 12 is engaged.

If the friction brake in the flexible clutch 10 is closed when the auxiliary motor 12 is switched off, the rotary furnace 1 remains in the position it has reached.

But if the auxiliary motor 12 fails through a fault, or if the friction brake in the flexible clutch 10 is inoperative for some reason, the rotary furnace 1 swings in either the forward or the reverse rotational direction. In either case the maximum rotary speed for the entire drive is limited by the centrifugal brake 11.

We claim:

1. Apparatus for driving rotary tube furnaces, mills and the like, comprising (a) a main drive including a main electric motor and main gearing disposed between the main motor and the unit being driven, (b) an auxiliary drive including an auxiliary electric motor and auxiliary gearing disposed between the auxiliary motor and the main gearing, (c) a clutch operative in both rotational directions between the auxiliary gearing and the main gearing, and (d) a centrifugal brake effective in both rotational directions connected to the auxiliary drive, wherein the improvement comprises a further centrifugal brake connected between the main motor and the main gearing, said brakes limiting excess rotary speed of said unit in both directions of rotation.

2. Apparatus according to claim 1, wherein the further centrifugal brake is operative only in the direction opposite to the normal operating direction.

3. Apparatus according to claim 1, wherein the further centrifugal brake has a braking speed corresponding to a speed of the main motor that is from 5 to 20% above its rated speed.

* * * * *